United States Patent [19]

Hatabe et al.

[11] 4,330,786
[45] May 18, 1982

[54] METHOD OF CONTROLLING THERMALLY CONTROLLING A THERMAL PRINTING HEAD

[75] Inventors: Etsuo Hatabe; Masatoshi Kato; Fumitake Tokugawa; Toshiharu Nozawa, all of Amagasaki, Japan

[73] Assignee: Mitsubishi Denki Kabushiki Kaisha, Tokyo, Japan

[21] Appl. No.: 160,571

[22] Filed: Jun. 17, 1980

[30] Foreign Application Priority Data

Jun. 18, 1979 [JP] Japan .................................. 54-77245

[51] Int. Cl.³ ...................... G01D 15/10; H05B 1/02; G05D 23/00
[52] U.S. Cl. ................................ 346/76 PH; 219/216
[58] Field of Search .................... 346/76 PH; 219/216

[56] References Cited

U.S. PATENT DOCUMENTS

| | | | |
|---|---|---|---|
| 3,725,898 | 4/1973 | Canton | 346/76 PH |
| 4,113,391 | 9/1978 | Minowa | 219/216 X |
| 4,168,421 | 9/1979 | Ito | 219/216 |

Primary Examiner—George H. Miller, Jr.
Attorney, Agent, or Firm—Wenderoth, Lind & Ponack

[57] ABSTRACT

A transistor causes a current to flow through a heat generating resistor in response to a picture signal and simultaneously, a capacitor coupled to the transistor is charged. When a charged voltage on the capacitor reaches a predetermined magnitude, the transistor stops the current to prevent the resistor from exceeding a predetermined magnitude and the capacitor begins to discharge. A plurality of resistors mentioned above are disposed in a row to form a thermally sensitive head which records a picture image on thermally sensitive paper as determined by the respective picture signals.

4 Claims, 21 Drawing Figures (PRIOR ART)

METHOD OF CONTROLLING THERMALLY CONTROLLING A THERMAL PRINTING HEAD

BACKGROUND OF THE INVENTION

This invention relates to improvements in a method of driving a thermal printing head, and more particularly to a method of thermally controlling a thermal printing head so as to enable the head to effect high speed recording.

Since thermal recording systems can reproduce picture images simply by means of thermal energy, they are useful as simple recording systems and the range of their use is rapidly increasing. For example, such recording systems are widely used in facsimile equipment and the like.

The conventional thermal recording systems have comprised a thermal printing head including a plurality of heat generating resistors disposed in a row, and a transistor connected between each of the heat generating resistors and an associated one of a plurality of signal terminals to which picture signals are applied respectively. The transistors are responsive to associated picture signals for being put in their ON states thereby to permit a current from a common source terminal to flow into those heat generating resistors connected to the conducting transistors to generate Joule heat. The resistors thus heated from elemental picture images or dots on a section of thermally sensitive paper contacted by the resistors as determined by the picture signals. This process is repeated with successive rows of the section of thermally sensitive paper to form a received picture image on the section of paper.

However, during repetition of the process as described above, the temperature of the heat generating resistors slowly rises due to the residual heat effect caused from the preceding flows of current through the resistors resulting in blurring of the recorded dots. Alternatively, the thermal printing head might be broken. Further the conduction-of-current cycle for each row on the thermally sensitive paper has been unable to be shortened beyond a particular limit because time intervals are required for heating and cooling the heat generating resistors.

Accordingly it is an object of the present invention to provide a new and improved method of thermally controlling a thermal printing head so as to increase the recording speed required for facsimile equipment and the like.

It is another object of the present invention to provide a new and improved method of thermally controlling a thermal printing head so as to improve the quality of pictures recorded by facsimile equipment and the like.

It is still another object of the present invention to provide a new and improved method of thermally controlling a thermal printing head so as to decrease a driving power required for recording by facsimile technique and the like.

SUMMARY OF THE INVENTION

The present invention provides a method of thermally controlling thermal printing head including a plurality of heat generating resistors disposed in a predetermined pattern and driven by respective driving circuits so that currents flow through the heat generating resistors in accordance with associated picture signals to generate heat, thereby to record a picture image on a section of thermally sensitive paper as determined by the picture signals. The method comprises the steps of finding the relationship between the conduction-of-current cycles and the conduction-of-current time intervals for each of the heat generating resistors which will prevent the temperature of each of the heat generating resistors from exceeding a predetermined magnitude, and controlling a current flowing through each of the heat generating resistors in accordance with the thus found conduction-of-current cycle and the conduction-of-current time interval.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
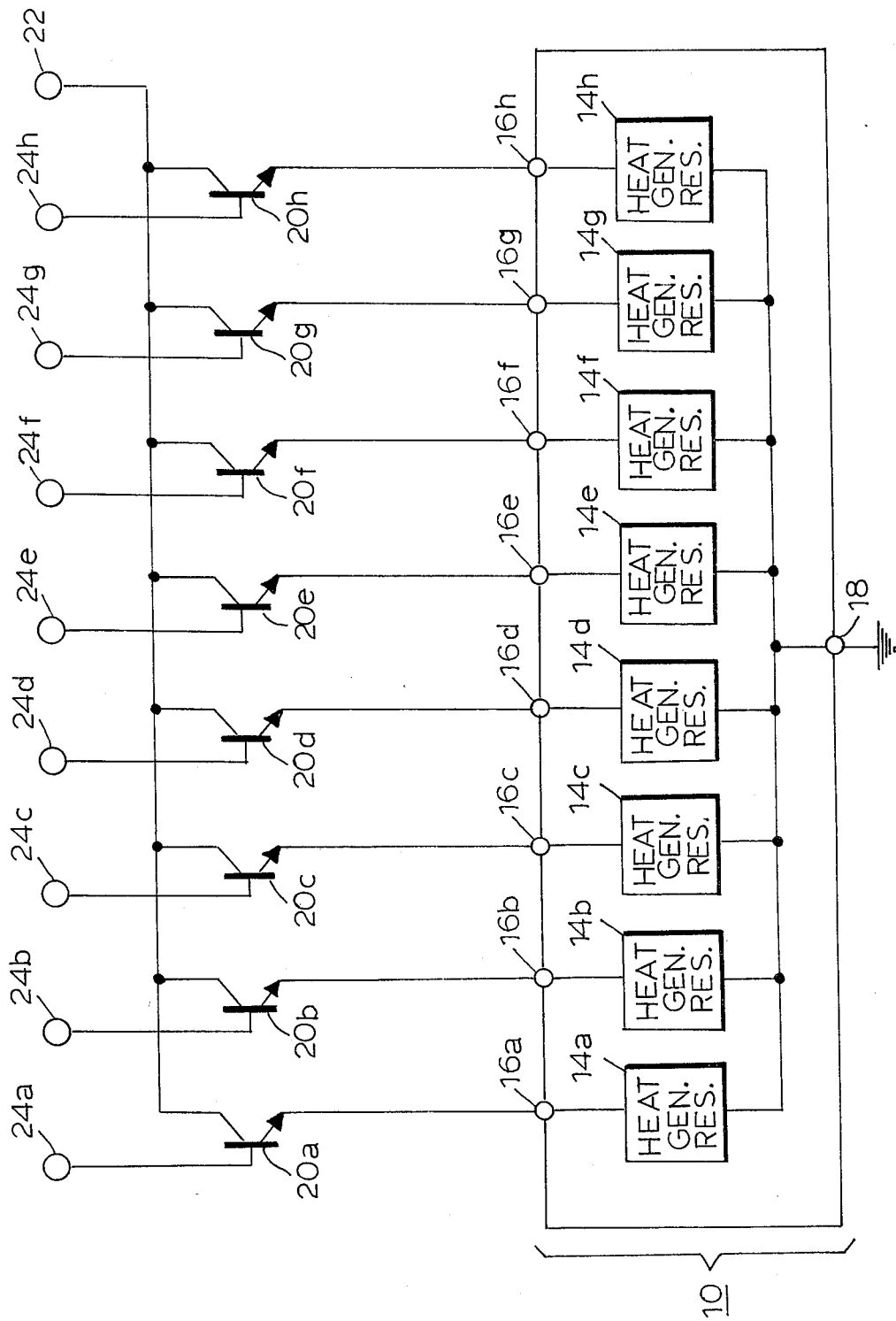
FIG. 1 is a circuit diagram of a conventional system for thermally controlling a thermal printing head.

Referring now to FIG. 1 of the drawings, there is illustrated a conventional arrangement for thermally controlling a group of thermal printing heads. The arrangement illustrated comprises a thermal printing head generally designated by the reference numeral 10 including an electrically insulating substrate 12 formed, for example of a ceramic material and a plurality of heat generating resistors, in this case, either rectangular resistors 14a, 14b, 14c, 14d, 14e, 14f, 14g and 14h disposed at predetermined equal intervals in a row on the surface of the substrate 12. The resistors 14a through 14h are connected at one end to respective terminals 16a, 16b, 16c, 16d, 16e, 16f, 16g and 16h and at the other ends to a common terminal 18 which is, in turn, connected to ground. The terminals 16a through 16h are connected to emitter electrodes of npn type transistors 20a, 20b, 20c, 20d, 20e, 20f, 20g including collector electrodes connected together to a source terminal 22. Each of the transistors 20a through 20h has a base electrode connected to a signal terminal 24 suffixed with the same reference character as the transistor. For example, the transistor 20b includes the base electrode connected to the signal terminal 24b.

The transistors 20a through 20h form a switching circuit which is selectively responsive to picture signals supplied to the signal terminals 24a through 24h to apply selectively a recording voltage from the source terminal 22 to the heat generating resistors 14a through 14h.

Figure 2A:
FIGS. 2a–2k illustrate waveforms developed at various points in the arrangement shown in FIG. 1.
Figure 2B:
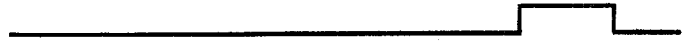
Figure 2C:
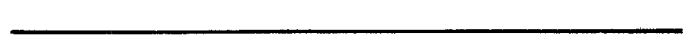
Figure 2D:
Figure 2E:
Figure 2F:
Figure 2G:
Figure 2H:
Figure 2I:

The operation of the arrangement shown in FIG. 1 will now be described with reference to the waveforms in FIGS. 2a–2h. In FIGS. 2a–2h the waveforms are applied to those signal terminals 24 suffixed with the same reference characters as those identifying the waveforms and plotted on the same time base as shown in FIG. 2i. For example, the waveform of FIG. 2a is applied to the signal terminal 24a to put the associated transistor 20a in its ON state between time points O and $T_H$. Similarly the transistors 20e and 20h are put in their ON state between time points O and $T_H$ as will readily be understood from the waveforms in FIGS. 2e and 2h.

As a result, a recording current through the source terminal 22 flows via the now conducting transistors 20a, 20e and 20h to the associated heat generating resistors 14a, 14e and 14h to cause the latter to generate Joule heat.

The thermal printing recording method utilizes that heat to form visible images in a first row on a section of thermally sensitive paper put under a pressure by the thermal printing head 10.

At time point $T_H$ the flows of currents into the selected heat generating resistors are ended whereupon, the thermally sensitive paper is displaced to a position where a second row is recorded.

Then the recording starts for the second row on the section of thermally sensitive paper at time point $T_H + T_C$. This recording is ended at time point $2T_H + T_C$ as will be seen from the time base FIG. 2i.

Thereafter the process as described above is repeated for the succeeding rows to complete the thermal recording.

While the arrangement of FIG. 1 has been illustrated and described in conjunction with the eight heat generating resistors, the same may include any desired number other than eight of the heat generating resistors.

The thermal printing heads 10 presently in existence include the heat generating resistors disposed at equal intervals of 165 $\mu$m to form an array having a length of 200 mm.

Figure 2J:
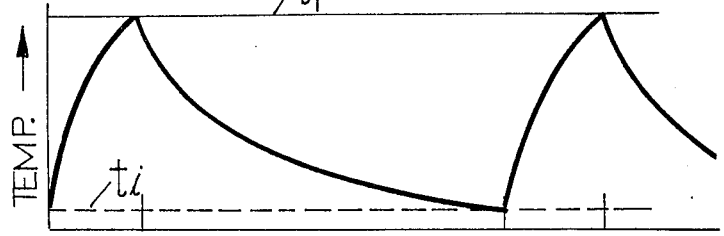

The arrangement of FIG. 1 used in a conventional driving method has been disadvantageous in that high speed recording can not be effected for the following reasons:

The waveform shown in FIG. 2j depicts the relationship between time and the surface temperature of the heat generating resistor 14a due to the application of current with the waveform of FIG. 2a to the signal terminal 24a as observed through an infrared microscope. More specifically, the current from the source terminal 22 starts to flow through the heat generating resistor 14a at time point O while the transistor 20a is maintained in its ON state between time points O and $T_H$. Accordingly the surface temperature of the resistor 14a rises at some time constant until it reaches a magnitude $t_f$. Thereafter the surface temperature descends at another time constant. The temperature $t_f$ is the temperature required for thermally sensitive paper to be colored with a satisfactory density and normally is about 400° C. A conduction-of-current time interval $T_H$ required for the heat generating resistor to rise to the temperature $t_f$ and a cooling time interval $T_C$ required for the heat generating resistor 14a raised to that temperature once to cool to a temperature $t_i$ before the current is initiated to flow through the resistor 14a depend upon the type of material of the thermal printing head, the structure thereof, and the thermal resistance and a heat capacity of the entire recording system including the thermally sensitive paper and platen therefor.

Figure 2K:
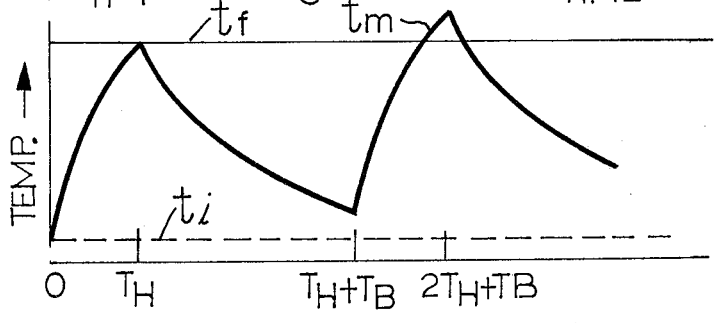

In the conventional driving method, therefore, the conduction-of-current cycle has been required to be set to a time no shorter than $T_H + T_C$ resulting in being unable to increase the recording speed beyond a certain limit. If the conduction-of-current cycle is set so as to be no longer than $T_H + T_C$, for example, to $T_H + T_B$ where $T_B$ is shorter than $T_C$, then the surface temperature of the heat generating resistor 14a changes as shown by the waveform in FIG. 2k. As shown by the waveform in FIG. 2k, the heat generating resistor 14a has a maximum surface temperature $t_m$ exceeding the predetermined temperature $t_f$. This is because heat is accumulated by the thermal printing head or the heat generating resistor due to the residual heat from the preceding conduction of the current. This results in a slow increase in the temperature of the thermal printing head as the conduction is repeated. As a result, there have been disadvantages in that recorded dots are blurred and the thermal printing head may be broken due to an accummulation of heat.

Even though a thermal printing head having a short thermal time constant was operatively associated with thermally sensitive paper having a high sensitivity, the conduction-of-current or heating time interval $T_H$ and the cooling time interval $T_C$ are, at present, required to be no shorter than 2 ms and no shorter than 8 ms required in order to provide a recording density exceeding a reflective optical density of 1.0. In conventional methods for driving the thermal printing head by an arrangement such as shown in FIG. 1, therefore, the conduction-of-current cycle for each row has been unable to be reduced to less than 10 ms by any means.

Noticing when the conduction-of-current cycle is short, the heat generating resistors slowly rise in due to the residual heat resulting from the flow of current therethrough during recording of the preceding row, because of the constant conduction-of-current time interval, the present invention seeks to provide a method for controlling thermal heat generating resistors or a thermal printing head comprising the step of controlling the conduction-of-current time interval for a row or recording line so as to prevent the maximum temperature of the thermal printing head from exceeding a predetermined constant magnitude whereby the high speed recording can be achieved.

Figure 3:
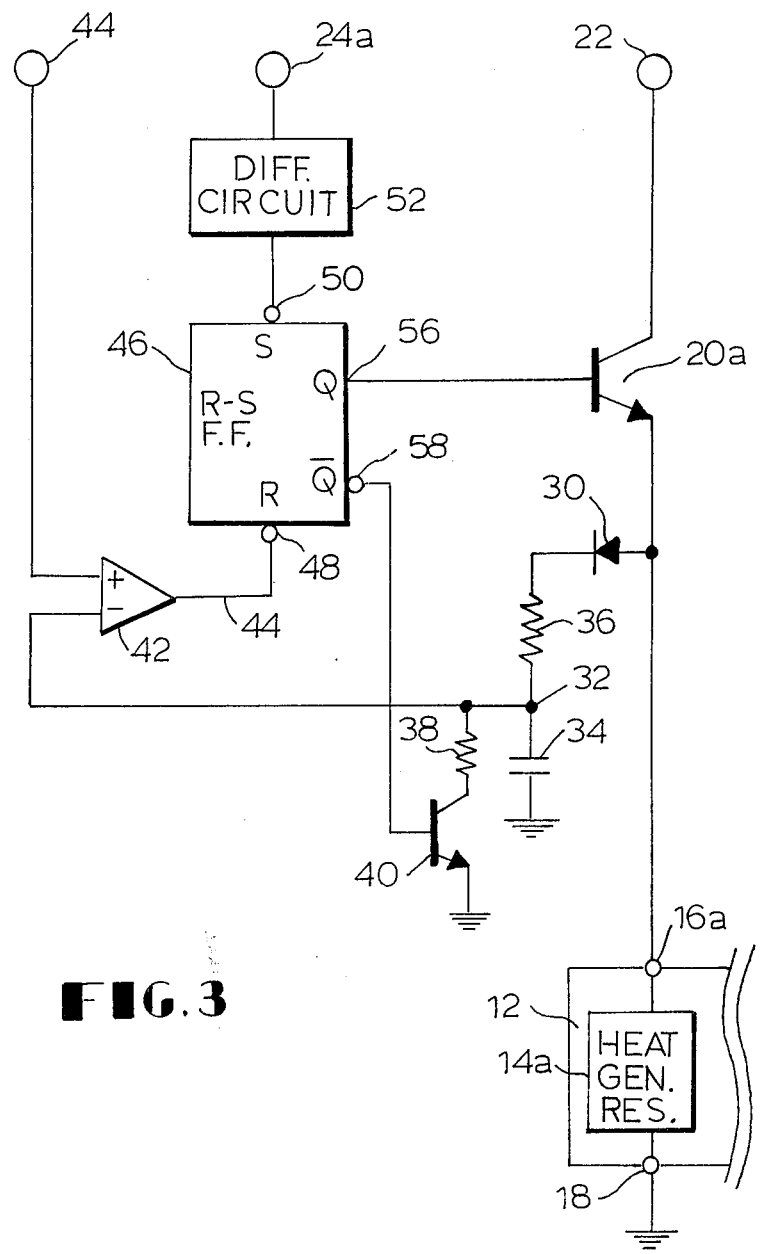
FIG. 3 is a fragmental circuit diagram of one embodiment of the thermal control arrangement for carrying out the method of the present invention, and illustrating only a single heat generating resistor and associated components.

Referring now to FIG. 3, there is illustrated an arrangement for carrying out a method of thermally controlling a thermal printing head according to the present invention. Only for purposes of illustration FIG. 3 shows a single heat generating resistor, in this case, a resistor 14a similar to that shown in FIG. 1 and a driving circuit therefore, like reference numerals and characters designating the components identical to those illustrated in FIG. 1. As in the arrangement of FIG. 1, the heat generating resistor 14a and the emitter-to-collector circuit of the npn type transistor 20a are connected in series circuit relationship between ground and the source terminal 22. The emitter electrode of the transistor 14a called a first transistor is also connected to ground through a series combination of a semiconductor diode 30, a resistor 36 and a capacitor 34 forming a network for charging the capacitor 34. The junction 32 of the capacitor 34 and the resistor 32 is connected to ground through a resistor 38 and a second npn transistor 40 including a collector electrode connected to the resistor 38 and an emitter electrode connected to ground. The resistor 38 and the second transistor 40 form a network for discharging the capacitor 34. Therefore, by alternatively placing the first and second transistors 20a and 40 in the ON state, the capacitor 34 is alternately brought into its charged and discharged states.

The junction 32 is further connected to a voltage comparator 42 through one input labelled —. The voltage comparator 42 has the other input labelled + and it is connected to a reference terminal 44 to which a reference voltage is applied. The voltage comparator 42 includes an output connected to an R-SS FLIP-FLOP 46. More specifically, the output of the comparator 42 is connected to a reset input 48 labelled R to the R-S FLIP-FLOP 46 including a set input 50 labelled S and connected to an output of a differentiating circuit 52. The differentiating circuit 52 is connected at the input to the signal terminal 24a. The R-S FLIP-FLOP 46 includes an output 56 labelled Q and connected to the base electrode of the first transistor 20a and an inverse output 58 labelled $\bar{Q}$ and connected to the second transistor 40 at the base electrode.

While FIG. 3 shows the heat generating resistor 14a and the driving circuit therefor it is to be understood that the arrangement of the overall circuit comprises a plurality of heat generating resistors similar to and disposed in the same manner as those shown in FIG. 1 and driving circuits identical to the driving circuit as described above in conjunctio with FIG. 3, one for each of the heat generating resistors. In the latter case the components of the driving circuit are designated by the respective reference numerals as shown in FIG. 3 suffixed with the reference characters identifying that heat generating resistor operatively coupled thereto. For example, the second transistors operatively coupled to the heat generating resistors 14a and 14b respectively are designated by 40a and 40b respectively.

The operation of the arrangement shown in FIG. 3 will now be described with reference to FIGS. 4a–4g wherein there are illustrated waveforms developed at various point in that arrangement on a common time base shown in FIG. 4h.

Figure 4A:
FIGS. 4a–4h illustrate waveforms developed at various points in the arrangement shown in FIG. 3.
Figure 4B:
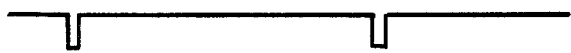
Figure 4C:
Figure 4D:
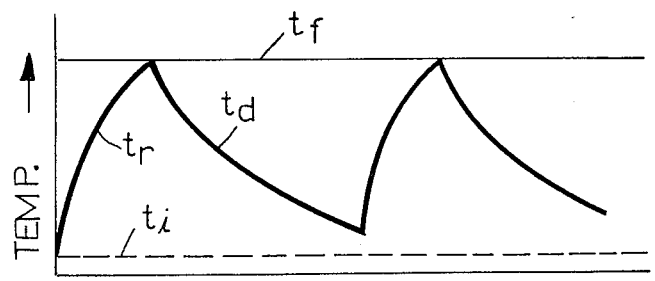

A picture signal having a waveform shown in FIG. 4a is applied via the signal terminal 24a to the differentiating circuit 52 where it is differentiated into the waveform shown in FIG. 4b. This waveform is supplied to the set input 50 of the R-S FLIP-FLOP 46. As a result, the R-S FLIP-FLOP 46 delivers an output changed from its low to its high level to the output 56 as shown by the waveform in FIG. 4c between time points O and $T_H$ (see FIG. 4h). Therefore the first transistor 20a is brought into its ON state in which a recording current from the source terminal 22 flows through the heat generating resistor 14a to raise its surface temperature following a temperature rising portion $t_r$ of the waveform shown in FIG. 4d.

Up to this point, the driving method of the present invention is substantially identical to that of the prior art practice such as shown in FIGS. 1 and 2.

One of the characteristic features of the present invention is to charge the capacitor 30 through the diode 30 and the resistor 36 in synchronization with the flow of current through the heat generating resistor 14a. The waveform shown in FIG. 4e shows the change in voltage at the junction 32 of the resistor 36 and the capacitor 34 and includes a charging voltage portion $v_c$ and a discharging voltage portion $v_d$ for the capacitor 34.

Heat phenomena can be generally simulated by using an integrating circuit formed of a resistor and a capacitor, and the temperature can be in one-to-one correspondence with the output voltage from the integrating circuit. Accordingly, by selecting predetermined magnitudes of the values of the resistor and capacitor 36 and 34 respectively, the charging voltage portion $v_c$ of the waveform shown in FIG. 4e for the capacitor 34 can approximate the temperature rising portion $t_r$ of the waveform shown in FIG. 4d for the heat generating resistor 14a with a fairly high accuracy.

Figure 4E:
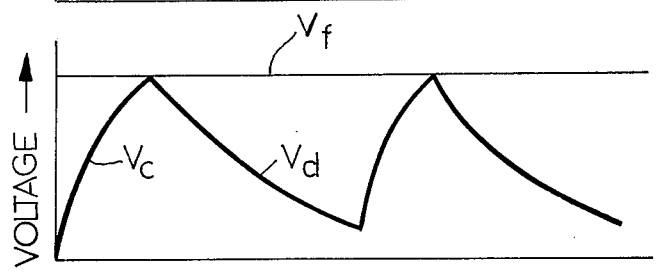
Figure 4F:
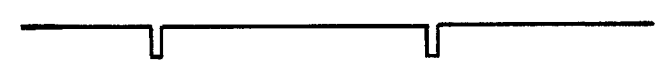

On the other hand, the temperature $t_f$ required for thermally sensitive paper to be colored with the ncesary and sufficient density can be converted to a reference voltage $v_f$ (see the waveform in FIG. 4e). Thus the temperature of the heat generating resistor 14a can be controlled according to a method as will subsequently be described.

Further, the magnitudes of the values of the resistor and capacitor 36 and 34 respectively can be analytically found by using a mathematical method such as a finite element method or the like but rough approximate magnitudes can also be found from simple recording experiments.

The voltage comparator 42 compares the voltage charged on the capacitor 34 with the reference voltage applied thereto from the reference terminal 44. When both voltages are equal to each other as determined by the voltage comparator 42, the latter delivers to the reset input 48 of the R-S FLIP-FLOP 46 an equality sensed pulse as shown by the waveform in FIG. 4f. The R-S FLIP-FLOP 46 responds to that equality sensed pulse to stop the flow of current through the heat generating resistor 14a. Therefore the resistor 14a is controlled so that the maximum temperature thereof is prevented from exceeding the temperature $t_f$.

Figure 4G:
Figure 4H:
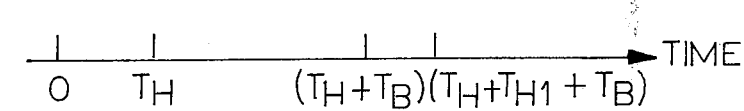

On the other hand, the output from the inverse output 58 of the R-S FLIP-FLOP 46 changes from its low to its high level by the and after time point $T_H$ as shown at waveform in FIG. 4g. This results in the second transistor 40 being put in its ON state. Accordingly, the electric charged on the capacitor 34 discharges through the resistor 38 and the now conducting transistor 40 with a time constant determined by the resistor 38 and the transistor 40. By properly selecting a predetermined magnitude of the value of the resistor 38, the discharging voltage portion $v_d$ of the waveform 4 shown in FIG. 4e can approximate the temperature dropping portion $t_d$ of the waveform shown in FIG. 4d with sufficient accuracy for practical purposes.

The process as described above is simultaneously effected for the remaining heat generating resistors in accordance with associated ones of the picture signals to complete the recording of a first row in a section of thermally sensitive paper.

Then after the section of paper has been displaced widthwise thereof as described in conjunction with FIGS. 1 and 2, recording of a second row is carried out at and after time point $T_H + T_B$ where $T_B$ is less than $T_C$ in the same manner as described above for the first row. That is, the temperature of the heat generating resistors is controlled in the manner as described above in conjunction with FIGS. 3 and 4. This results in a definite recording free from blurring.

From the foregoing it is seen that, according to the present invention, each of the heat generating resistors have the maximum temperature thereof reach a predetermined constant magnitude by controlling the conduction-of-current time interval for each recording row. Therefore the present invention provides recorded pictures of high quality not only with high speed recording but also with a recording speed variable in accordance with the amount of information included in the material being transmitted. Also the present invention can effectivity utilize the residual heat due to the recording of the preceding row resulting in a sharp decrease in the burden on the associated electric source.

While the present invention has been illustrated and described in conjunction with a single preferred embodiment thereof it is to be understood that numerous changes and modifications may be resorted to without departing from the spirit and scope of the present invention. For example, the present invention has been described in conjunction with the control of the conduction-of-current time interval by having the output voltage from the integrating circuit converted from the temperature of the heat generating resistor, but it is to be understood that the conduction-of-current time interval may be controlled by utilizing a non-volatile memory device such as a read only memory device. In the latter case the non-volatile memory device has preliminarily stored therein the relationship between the conduction-of-current cycle and the conduction-of-current time interval required for and determined by that cycle. Upon recording, the relationship between the conduction-of-current cycle and time interval may be read out from the memory device for each conduction-of-current cycle and the conduction-of-current time interval may be controlled by supplying the associated heat generating resistor with a current only for the conduction-of-current time interval readout from the memory device. This measure is advantageous over the embodiment of the present invention shown in FIG. 3 in that the number of circuit components such as the resistors and capacitors can be reduced when the number of the heat generating resistors increases.

While the present invention has been illustrated in conjunction with a facsimile system including a plurality of heat generating resistors in the form of rectangles, it is to be understood that the same is equally applicable to a heat generating resistors having shapes other than a rectangular shape and also to printers, plotters etc.

What we claim is:

1. A method of controlling a thermal printing head having a plurality of heat generating resistors disposed in a predetermined pattern and driven by respective driving circuits for causing currents to flow through said heat generating resistors in accordance with associated image signals to generate heat therefrom for recording an image on a section of thermally sensitive paper corresponding to said image signals, which method comprises the steps of:

electrically simulating the change of the temperature of each of said heat generating resistors with respect to time by means of a change in an electrical parameter with respect to time; and controlling the current flowing through each of said heat generating resistors for terminating current flow through the respective heat generating resistors when said electrical parameter reaches a level corresponding to a predetermined level of said temperature.

2. An apparatus for controlling a thermal printing head having a plurality of heat generating resistors disposed in a predetermined pattern and driven by respective driving circuits for causing currents to flow through said heat generating resistors in accordance with associated image signals to generate heat therefrom for recording an image on a section of thermally sensitive paper corresponding to said image signals, which apparatus comprises:

electric circuit means for electrically simulating the change of temperature of each of said heat generating resistors with respect to time and having a circuit element the electrical parameter of which changes with respect to time in a manner corresponding to the change of temperature of the respective heat generating resistor with respect to time; and current control means connected to said electric circuit means for terminating current flow through the respective heat generating resistors in response to the electrical parameter of said circuit element reaching a level corresponding to a predetermined level of said temperature.

3. An apparatus as claimed in claim 2 in which said electric circuit means comprises an integrating circuit connected to each driving circuit and said circuit element is a circuit element which is charged from the current flowing through the corresponding heat generating resistor, and said current control means comprises switching means for switching the flow of current in the driving circuit off when the voltage to which said circuit element is charged reaches a reference voltage level.

4. An apparatus as claimed in claim 3 in which said integrating circuit comprises a first resistor and a capacitor connected thereto and constituting said circuit element, and said integrating circuit further comprises a discharging circuit having a second resistor and a capacitor, and said switching comprises means for switching said discharge circuit for discharging said capacitor connected to said first resistor when said flow of current in the driving circuit is switched off.

* * * * *